United States Patent
Fuhs et al.

(10) Patent No.: US 8,578,069 B2
(45) Date of Patent: Nov. 5, 2013

(54) PREFETCHING FOR A SHARED DIRECT MEMORY ACCESS (DMA) ENGINE

(75) Inventors: Ronald E. Fuhs, Rochester, MN (US); Scott M. Willenborg, Stewartville, MN (US)

(73) Assignee: International Business Machines Corporation, Armonk, NY (US)

( * ) Notice: Subject to any disclaimer, the term of this patent is extended or adjusted under 35 U.S.C. 154(b) by 20 days.

(21) Appl. No.: 13/438,864

(22) Filed: Apr. 4, 2012

(65) Prior Publication Data
US 2013/0268700 A1    Oct. 10, 2013

(51) Int. Cl.
*G06F 13/28*    (2006.01)

(52) U.S. Cl.
USPC .............................. 710/22; 710/306; 702/186

(58) Field of Classification Search
None
See application file for complete search history.

(56) References Cited

U.S. PATENT DOCUMENTS

| | | | | |
|---|---|---|---|---|
| 5,982,441 | A * | 11/1999 | Hurd et al. | 348/417.1 |
| 6,047,340 | A * | 4/2000 | Kase et al. | 710/60 |
| 6,581,129 | B1 * | 6/2003 | Buckland et al. | 710/306 |
| 7,010,607 | B1 * | 3/2006 | Bunton | 709/228 |
| 7,032,042 | B2 * | 4/2006 | Jeppsen et al. | 710/60 |
| 7,054,790 | B1 * | 5/2006 | Rich | 702/186 |
| 2011/0113199 | A1 | 5/2011 | Tang et al. | |
| 2011/0264884 | A1 * | 10/2011 | Kim | 711/170 |

* cited by examiner

*Primary Examiner* — Elias Mamo
(74) *Attorney, Agent, or Firm* — Jason Sosa; Robert Williams

(57) ABSTRACT

A system is disclosed for fetching control instructions for a direct memory access (DMA) engine shared between a plurality of threads. For a data transfer from a first thread by a DMA engine, the DMA engine fetches and processes a predetermined number of control instructions (or work queue elements) for the data transfer, each of the control instructions including an amount and location of data to transfer. The DMA engine determines a total amount of data transferred as a result of the data transfer. The DMA engine then determines a difference between the total amount of data transferred and a threshold amount of data, wherein the threshold amount of data indicates a preferred amount of data to be transferred for the first thread. The predetermined number of control instructions to fetch is updated based on the determined difference.

16 Claims, 3 Drawing Sheets

PREFETCHING FOR A SHARED DIRECT MEMORY ACCESS (DMA) ENGINE

FIELD OF THE INVENTION

The present invention relates generally to direct memory access (DMA), and more particularly to managing data transfer from multiple sources via a DMA engine.

BACKGROUND OF THE INVENTION

Direct memory access (DMA) is a feature that allows for hardware subsystems within a computer system to access system memory independently of a system processor. This allows the system processor to perform other tasks while a DMA engine completes a data transfer, making DMA engines especially useful in input/output (I/O) applications. Common hardware subsystems using DMA engines include graphics cards, sound cards, network cards, and disk drive controllers. DMA engines can also be used for "memory to memory" copying or moving data within memory. DMA can offload expensive memory operations, such as large scatter-gather operations, from a system processor to a dedicated DMA engine.

A DMA engine can generate addresses and initiate memory read or write cycles. Typically, a DMA engine contains several registers that can be written and read by a system processor, including, for example, a memory address register, a byte count register, and one or more control registers. The control registers may specify the I/O port to use, the direction of the transfer (reading from the I/O device or writing to the I/O device), the transfer unit (byte at a time or word at a time), and the number of bytes to transfer in one burst.

Sophisticated DMA engines often process data based on instructions in a list or work queue specific to the hardware subsystem that data is being received from or sent to. These instructions are referred to herein as "work queue elements," "WQEs," or "control instructions." Each element in the work queue should provide at least a source location (e.g., in memory or a remote system) from which to fetch data, a target destination (e.g., in memory or a remote system) where the fetched data should be stored, and how much data to move from the source location to the target destination. In other embodiments, work queue elements may describe multiple addresses from which to pull and store data, and may translate scatter-gather lists to determine source and/or target locations.

In some instances, it can be desirable to have multiple work queue elements held in the DMA engine so that as soon as one completes, the next can start, thereby avoiding latency issues associated with fetching the next work queue element. A common way to do this is to have software "push" the work queue elements to the DMA engine and have the engine hold them internally (e.g., in an array). This approach requires communication from hardware to software on when the next work queue element should be pushed to hardware and may require substantial silicon area to store the work queue elements.

Alternatively, the DMA engine can prefetch the work queue elements. In this manner, the DMA engine can fetch the next work queue element while finishing up the previous work queue element, thereby avoiding the latency associated with fetching a work queue element after completing an operation, and negating the need for closely timed software-hardware interaction.

When the DMA engine is shared among many threads—unrelated streams of data to be processed, e.g., from different logical ports or partitions, processors, channels, queue pairs (in Infiniband/HEA terms), etc.—the DMA engine must balance the costs of switching between threads and maintaining a level of fairness in processing data from the threads. For example, there is often significant overhead associated with switching from one thread to another. A variety of context may be needed for each thread (e.g., head/tail pointers, translation entries, logical partition protection information, miscellaneous control information, etc.) and switching from one thread to another requires storing/updating the existing context and fetching new context for the new thread. As such, it is advantageous to remain on one thread for as long as possible (as long as there are work queue elements). However, a single thread cannot be processed to the exclusion of the other threads.

It is known to accomplish "fairness" between threads by switching from one thread to another once a certain number of bytes of data (a threshold value) has been moved for a current thread.

SUMMARY

One embodiment of the present invention discloses a method and system for fetching control instructions for a direct memory access (DMA) engine shared between a plurality of threads. The system comprises control logic to select a first thread for participation in a data transfer operation with a DMA engine. The DMA engine fetches and processes a predetermined number of control instructions for the data transfer operation with the first thread, wherein each of the control instructions includes an amount of data to transfer, at least one source location where the amount of data is transferred from, and at least one destination location where the amount of data is transferred to. The DMA engine determines a total amount of data transferred as a result of the data transfer operation. The DMA engine then determines a difference between the total amount of data transferred and a threshold amount of data, wherein the threshold amount of data indicates a preferred amount of data to be transferred for the first thread. Finally, the system comprises control logic to update, for a subsequent data transfer operation with the first thread, the predetermined number of control instructions to fetch based on the determined difference.

DETAILED DESCRIPTION

Figure 1:
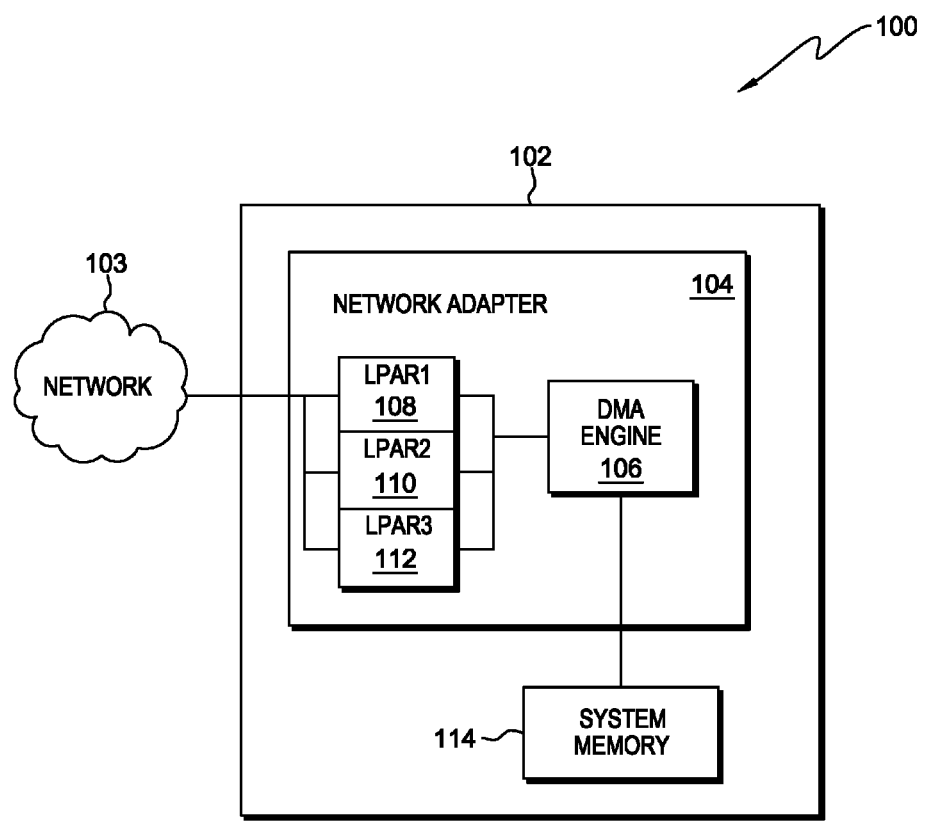
FIG. 1 illustrates a networked data processing system, in accordance with an illustrative embodiment of the present invention.

The present invention will now be described in detail with reference to the Figures. FIG. 1 illustrates a networked data processing system, generally designated 100, according to one embodiment of the present invention. Data processing system 100 comprises computer system 102 connected to network 103. Network 103 represents a collection of computers and devices interconnected by communication channels that facilitate communications and resource sharing between the interconnected computers and devices. The communication channels may include wire, wireless communication links, or fiber optic cables. Computer system 102 may be a server computer, a client computer, a notebook computer, a laptop computer, a tablet computer, a handheld device or smart-phone, a thin client, or any other electronic device or computing system.

Network adapter 104 allows computer system 102 to communicate over network 103. In another embodiment, any network interface device may be used. Direct memory access (DMA) engine 106 comprises control logic to directly access system memory 114 and transfer data between system memory 114 and a remote system via network 103. Control logic is a sequence of steps required to perform a specific function, and, in the preferred embodiment, is implemented through firmware, typically hardwired computer circuits and other hardware or, alternatively, low-level program instructions stored on a read only memory (ROM) and executed by one or more control circuits.

As depicted, DMA engine 106 is a shared DMA engine between logical partitions 108, 110, and 112 of network adapter 104. In a virtualized environment, different operating system images or instances may each have access to their own "virtual" network adapter. Each virtual network adapter may share a single physical network adapter, i.e., network adapter 104. Logical partitions 108, 110, and 112 represent a division of network adapter 104 between different virtual operating systems. In one embodiment, data received by network adapter 104 via network 103 may be labeled and/or separated by the operating system/logical partition that the data was requested by, sent to, or otherwise associated with. Data received for each respective logical partition is a separate thread to be processed by DMA engine 106. A person of ordinary skill in the art will recognize that alternatively, or in addition, to receiving multiple threads from separate logical partitions or ports, a shared DMA engine may process threads from separate I/O components (e.g., a graphics card and sound card), queue pairs, channels, processors, etc.

Embodiments of the present invention recognize that the amount of data associated with a work queue element is not always easily known (e.g., when the work queue element uses a scatter-gather list without an overall length indication, etc.). Embodiments of the present invention further recognize that if a work queue element is prefetched, and it is subsequently determined that executing the work queue element would put the thread over a threshold value of moved data (the "data threshold") for switching between threads, the resources used for prefetching the work queue element may be wasted if the DMA engine switches to another thread without executing the work queue element; yet always executing a final work queue element, even if it exceeds the data threshold, may eventually lead to significant unfairness in processing different threads. Embodiments of the present invention instead use a threshold value of work queue elements or control instructions to prefetch (hereafter referred to as the "prefetch threshold"), wherein the DMA engine may not fetch more than the prefetch threshold. Each work queue element fetched (or in this instance, prefetched) is subsequently executed, thereby ensuring that resources are being used efficiently. Further, the prefetch threshold is dynamic so that it may be subsequently adjusted to achieve fairness in thread processing.

In a preferred embodiment, a data threshold is set indicating how much data should be processed for a given thread prior to switching to another thread. For each thread, an average amount of data moved per work queue element is given for the specific thread (and may be sent to the DMA engine with context information for the specific thread). The prefetch threshold may be determined by dividing the data threshold by the average amount of data moved per work queue element. Thus, if a given thread is primarily used for handling short packets (e.g., TCP/IP acknowledge packets), the prefetch threshold for the given thread would be set relatively high to allow work queue elements to continue to be prefetched even as the total number of bytes transferred approaches the data threshold. If a given thread is primarily used for handling mid to large size packets, the prefetch threshold for the given thread would be set lower to avoid prefetching work queue elements that would likely cause the data threshold to be exceeded.

Additionally, a "fairness" value is kept indicating the difference between the amount of data processed by the prefetched work queue elements (e.g., by tracking the number of bytes that the thread sends before switching to another thread) and the data threshold. Because the prefetch threshold is based on an average amount of data transferred per work queue element, it will not always result in the proper amount of data being transferred. For example, a thread normally having large packets may quit prefetching work queue elements early as the thread's typical packet is large. However, the last prefetched work queue element may ultimately turn out to be a short packet, causing the amount of data transferred for a given thread to fall short of the amount of data that should have been transferred to maintain fairness between threads (as indicated by the data threshold). Instead of fetching another work queue element to meet the data threshold requirement, resulting in additional latency, this discrepancy is stored as the fairness value in a context field associated with the thread. When the DMA engine begins processing the same thread the next time around, this shortfall stored in the fairness value is added to the data threshold so that the determined prefetch threshold may increase as necessary to maintain fairness. Similarly, if the amount of transferred data runs over the data threshold, the stored difference may be subtracted from the data threshold when it is next dispatched.

Figure 2:
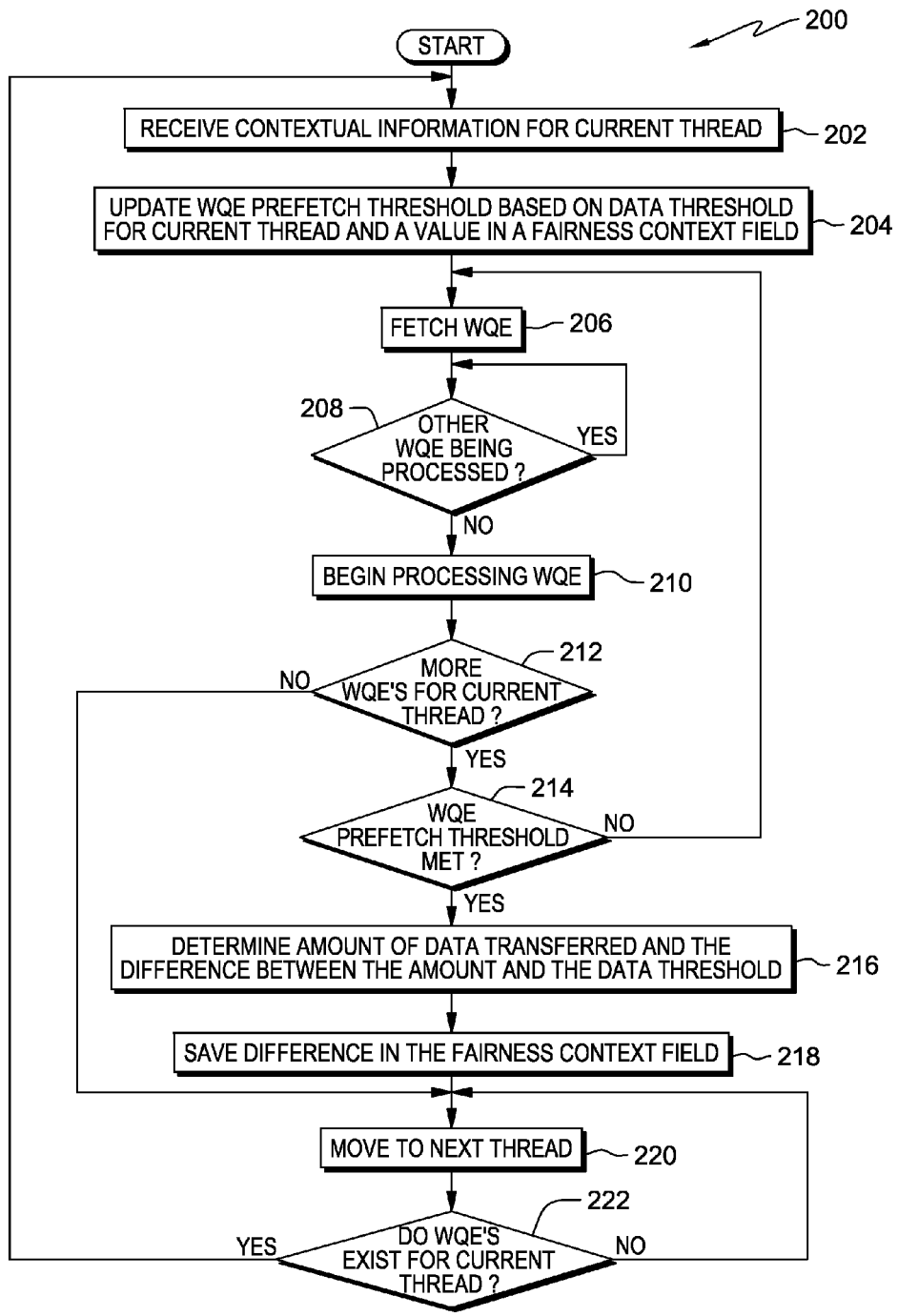
FIG. 2 depicts the operational steps of control logic for a DMA engine according to one embodiment of the present invention.

FIG. 2 depicts the operational steps of control logic 200 for a DMA engine according to one embodiment of the present invention.

At the start of processing a thread, the DMA engine receives contextual information for the current thread (step 202). Examples of the contextual information may include head/tail pointers into memory, translation entries, a data threshold, an average amount of data transferred by work queue elements from the current thread and/or a prefetch threshold based on the average amount of data transferred by work queue elements, and a fairness value.

In one embodiment, the average amount of data transferred by work elements from the current thread is predefined by software. In another embodiment, the average amount of data transferred by work queue elements may be calculated or updated based on a history of data transferred per work queue element. In such an embodiment, the average may be updated after every round of processing/transferring data from a given thread.

Subsequent to receiving the contextual information, the DMA engine updates the prefetch threshold based on the data threshold for the current thread and the fairness value (step 204). In a preferred embodiment, as described previously, the data threshold (which remains static) may be combined with the amount of data that should be added or subtracted based on the amount of data transferred the previous time data was being transferred to or from the thread, i.e., the fairness value, should such a discrepancy exist. The new total may be divided by the average amount of data transferred per work queue element to determine an updated prefetch threshold.

In another embodiment, the prefetch threshold is always passed as the same value to the DMA engine. The fairness value may be divided by the average amount of data transferred per work queue element to determine a number of work queue elements that should be added or subtracted from the prefetch threshold.

The DMA engine fetches the next sequential work queue element (step 206). If a previous work queue element is still being processed (yes branch, decision 208), the DMA engine allows the previous work queue element to finish. If there is not a previous work queue element being processed (no branch, decision 208), the DMA engine begins processing the fetched work queue element (step 210).

The DMA engine determines whether there are more work queue elements for the current thread (decision 212). If more work queue elements exist (yes branch, decision 212), the DMA engine determines whether the prefetch threshold has been met (decision 214). If the prefetch threshold has not been met (no branch, decision 214), the DMA engine fetches the next work queue element (step 206) and repeats the process. If, on the other hand, the prefetch threshold has been met (yes branch, decision 214), the DMA engine determines the amount of data transferred for the current thread, and the difference between the amount transferred and the data threshold (step 216). The difference is saved as the fairness value (step 218).

Subsequent to saving the difference as the fairness value, the DMA engine moves to the next thread (step 220).

Returning to decision 212, if the DMA engine determines that there are no more work queue elements for the current thread to process (no branch, decision 212), the DMA engine moves to the next thread (step 220). In one embodiment, responsive to determining that there are no more work queue elements in the current thread, i.e., the thread has finished processing, the DMA engine may reset the fairness value back to zero.

After moving to the next thread, the DMA engine determines whether any work queue elements exist for the now current thread (decision 222). If no work queue elements exist (no branch, decision 222), the DMA engine moves to the next thread (step 220). If work queue elements do exist (yes branch, decision 222), the DMA engine receives contextual information for the now current thread (step 202) and repeats the process.

Figure 3:
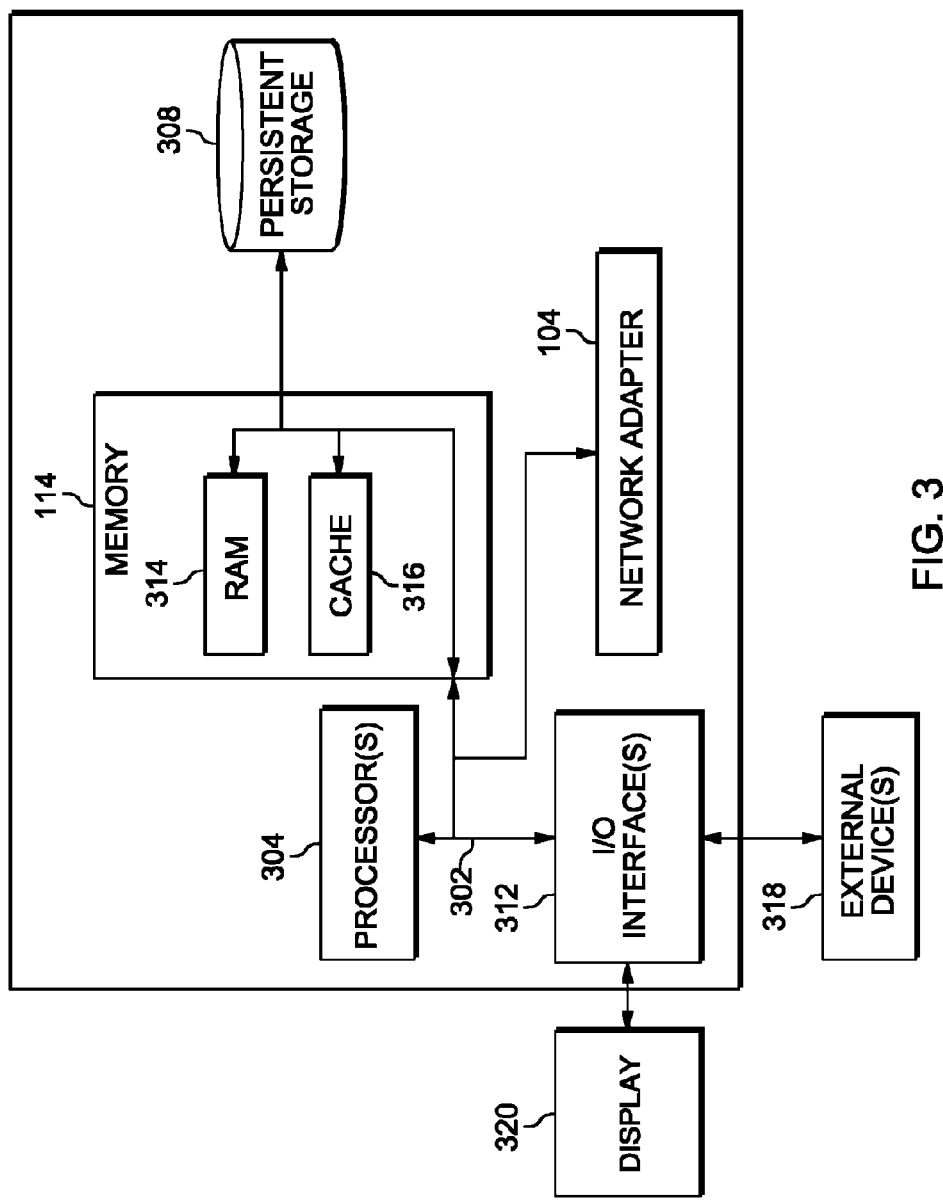
FIG. 3 depicts a block diagram of components of computer system in accordance with an illustrative embodiment.

FIG. 3 depicts a block diagram of components of computer system 102 in accordance with an illustrative embodiment. It should be appreciated that FIG. 3 provides only an illustration of one implementation and does not imply any limitations with regard to the environment in which different embodiments may be implemented. Many modifications to the depicted environment may be made.

Computer system 102 includes communications fabric 302, which provides communications between processor(s) 304, memory 114, persistent storage 308, network adapter 104, and input/output (I/O) interface(s) 312.

Memory 114 and persistent storage 308 are examples of computer-readable tangible storage devices. A storage device is any piece of hardware that is capable of storing information, such as, data, program code in functional form, and/or other suitable information on a temporary basis and/or permanent basis. Memory 114 may be, for example, one or more random access memories (RAM) 314, cache memory 316, or any other suitable volatile or non-volatile storage device. Memory 114 is also accessible to any existing DMA engines.

Program instructions are stored in persistent storage 308 for execution by one or more of the respective processors 304 via one or more memories of memory 114. In order to free up one or more of the respective processors 304, when program instructions have initiated data transfer to or from memory 114, the one or more processors may offload the data transfer to a DMA engine.

Network adapter 104 provides for communications with other data processing systems or devices. In these examples, network adapter 104 includes a DMA engine, and as data packets are received from other data processing systems or devices, the one or more processors offloads the data transfer to the DMA engine. Network adapter 104 may provide communications through the use of either or both physical and wireless communications links. In another embodiment still, data processing system 100 may be devoid of network adapter 104.

I/O interface(s) 312 allows for input and output of data with other devices that may be connected to computer system 102. For example, I/O interface 312 may provide a connection to external devices 318 such as a keyboard, keypad, a touch screen, and/or some other suitable input device. I/O interface(s) may also connect to a display 320. I/O interfaces 312 also, preferably, contain one or more DMA engines.

Based on the foregoing, a method and system have been disclosed for performing multi-threaded processing on order sensitive data packets. However, numerous modifications and substitutions can be made without deviating from the scope of the present invention. In this regard, each block in the flowcharts or block diagrams may represent a module, segment, or portion of control logic for implementing the specified logical function(s). It should also be noted that, in some alternative implementations, the functions noted in the blocks may occur out of the order noted in the figures. Therefore, the present invention has been disclosed by way of example and not limitation.

What is claimed is:

1. A method for fetching control instructions for a direct memory access (DMA) engine shared between a plurality of threads, the method comprising the steps of:
    selecting a first thread for participation in a data transfer operation with a DMA engine;
    the DMA engine fetching and processing a predetermined number of control instructions for the data transfer operation with the first thread, wherein each of the control instructions includes an amount of data to transfer, at least one source location where the amount of data is transferred from, and at least one destination location where the amount of data is transferred to;
    determining a total amount of data transferred as a result of the data transfer operation;
    determining a difference between the total amount of data transferred and a threshold amount of data, wherein the threshold amount of data indicates a preferred amount of data to be transferred for the first thread; and updating, for a subsequent data transfer operation with the first thread, the predetermined number of control instructions to fetch based on the determined difference;
    wherein the step of updating the predetermined number of control instructions comprises: dividing the difference between the total amount of data transferred and the threshold amount of data to determine a number of control instructions to add or subtract, depending on whether the total amount of data transferred was less than or greater than the threshold amount of data, to the predetermined number; and adding or subtracting the determined number to the predetermined number of control instructions.

2. The method of claim 1:
wherein the control instructions from the predetermined number of control instructions are sequentially ordered; and
wherein the step of the DMA engine fetching and processing the predetermined number of control instructions for the data transfer operation with the first thread comprises the DMA engine sequentially fetching and processing the predetermined number of control instructions.

3. The method of claim 1, wherein the step of the DMA engine fetching and processing the predetermined number of control instructions comprises:
fetching and processing a first control instruction from the predetermined number of control instructions;
while the DMA engine is processing the first control instruction, the DMA engine fetching a second control instruction from the predetermined number of control instructions;
subsequent to the DMA engine completing processing of the first control instruction, processing the second control instruction; and
while the DMA engine is processing the second control instruction, fetching a third control instruction.

4. The method of claim 1, wherein the predetermined number of control instructions for the data transfer operation is an estimated number of control instructions necessary to reach the threshold amount of data.

5. The method of claim 1, wherein the predetermined number of control instructions is based, at least in part, on an average amount of data transferred by individual control instructions for the first thread and the threshold amount of data.

6. The method of claim 5, wherein the average amount of data transferred by individual control instructions for the first thread is predefined in software.

7. The method of claim 5, wherein the average amount of data transferred by individual control instructions for the first thread is based on a history of processed control instructions.

8. The method of claim 1, wherein the step of updating the predetermined number of control instructions comprises:
combining the difference, between the total amount of data transferred and the threshold amount of data, to the threshold amount of data, based on whether the total amount of data transferred was greater than or less than the threshold amount of data; and
dividing the combined difference and threshold amount of data by an average amount of data transferred by individual control instructions for the first thread.

9. A computer system for fetching control instructions for a direct memory access (DMA) engine shared between a plurality of threads, the computer system comprising:
one or more processors, one or more computer-readable memories, a plurality hardware subsystems, and a DMA engine capable of performing respective data transfer, operations, for at least one of the one or more processors, between a plurality of hardware subsystems and at least one of the one or more computer-readable memories, the DMA engine comprising control logic operable to:
select a first thread for participation in a data transfer operation with the DMA engine;
fetch and process a predetermined number of control instructions for the data transfer operation with the first thread, wherein each of the control instructions include an amount of data to transfer, at least one source location where the amount of data is transferred from, and at least one destination location where the amount of data is transferred to;
determine a total amount of data transferred as a result of the data transfer operation;
determine a difference between the total amount of data transferred and a threshold amount of data, wherein the threshold amount of data indicates a preferred amount of data to be transferred for the first thread; and update, for a subsequent data transfer operation with the first thread, the predetermined number of control instructions to fetch based on the determined difference;
wherein the control logic operable to update the predetermined number of control instructions comprises control logic operable to:
divide the difference between the total amount of data transferred and the threshold amount of data to determine a number of control instructions to add or subtract, depending on whether the total amount of data transferred was less than or greater than the threshold amount of data, to the predetermined number; and
add or subtract the determined number to the predetermined number of control instructions.

10. The computer system of claim 9:
wherein the control instructions from the predetermined number of control instructions are sequentially ordered; and
wherein the control logic operable to fetch and process the predetermined number of control instructions comprises the DMA engine being operable to sequentially fetch and process the predetermined number of control instructions.

11. The computer system of claim 9, wherein the control logic operable to fetch and process the predetermined number of control instructions comprises control logic operable to:
fetch and process a first control instruction from the predetermined number of control instructions;
while the DMA engine is processing the first control instruction, fetch a second control instruction from the predetermined number of control instructions;
subsequent to the DMA engine completing processing of the first control instruction, process the second control instruction; and
while the DMA engine is processing the second control instruction, fetch a third control instruction.

12. The computer system of claim 9, wherein the predetermined number of control instructions for the data transfer operation is an estimated number of control instructions necessary to reach the threshold amount of data.

13. The computer system of claim 9, wherein the predetermined number of control instructions is based, at least in part, on an average amount of data transferred by individual control instructions for the first thread and the threshold amount of data.

14. The computer system of claim 13, wherein the average amount of data transferred by individual control instructions for the first thread is predefined in software.

15. The computer system of claim 13, wherein the average amount of data transferred by individual control instructions for the first thread is based on a history of processed control instructions.

16. The computer system of claim 9, wherein the control logic operable to update the predetermined number of control instructions comprises control logic operable to:
combine the difference, between the total amount of data transferred and the threshold amount of data, to the threshold amount of data, based on whether the total amount of data transferred was greater than or less than the threshold amount of data; and divide the combined difference and threshold amount of data by an average amount of data transferred by individual control instructions for the first thread.

* * * * *